(12) United States Patent
Sako et al.

(10) Patent No.: US 6,226,247 B1
(45) Date of Patent: *May 1, 2001

(54) DATA RECORDING APPARATUS THAT IDENTIFIES THE TYPE OF DATA IN EACH BLOCK OF DATA

(75) Inventors: Yoichiro Sako, Chiba; Katsumi Toyama, Kanagawa, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/817,781
(22) PCT Filed: Aug. 22, 1996
(86) PCT No.: PCT/JP96/02344
§ 371 Date: Apr. 21, 1997
§ 102(e) Date: Apr. 21, 1997
(87) PCT Pub. No.: WO97/08695
PCT Pub. Date: Mar. 6, 1997

(30) Foreign Application Priority Data

Aug. 24, 1995 (JP) ................................. 7-239119

(51) Int. Cl.⁷ .................................................. G11B 7/0045
(52) U.S. Cl. ............................................. 369/54; 369/59
(58) Field of Search ................................. 369/47–48, 50, 369/54, 58–59, 124, 124.07–124.09

(56) References Cited

U.S. PATENT DOCUMENTS 5,200,943 * 4/1993 Sano et al. .............................. 369/48
5,200,944 * 4/1993 Souma .................................. 369/48
5,327,406 7/1994 Sako ...................................... 369/32
5,455,814 10/1995 Sako ...................................... 369/59
5,694,381 12/1997 Sako ...................................... 369/58
5,732,088 3/1998 Sako .
5,757,752 5/1998 Sako ...................................... 369/59
5,831,954 11/1998 Sako et al. ............................ 369/59

FOREIGN PATENT DOCUMENTS 3-176869 7/1991 (JP) .
5-101541 4/1993 (JP) .
5-94677 4/1993 (JP) .
6-111459 4/1994 (JP) .
7-73593 3/1995 (JP) .

* cited by examiner

Primary Examiner—W. R. Young
(74) Attorney, Agent, or Firm—Limbach & Limbach L.L.P.

(57) ABSTRACT

CD-ROM data is received to an interface 1. When a high reliability is required, a sector segmenting circuit 4 is selected by a switching circuit 3. The input data is sector segmented to the CD-ROM sector by the circuit 4. When a large recording capacity is requested, a CD-ROM decoder 5 is selected by the switching circuit 3. After the CD-ROM data was error corrected, user bytes in the data are sector segmented into 2-kbyte sector. The data converted into the CD-ROM sector or 2-kbyte sector is integrated to a block structure by the block segmenting circuit 7 and is, further, subjected to processes such as error correction coding and digital modulation by a recording processing circuit 8. A pattern of a sync that is added by the recording processing circuit 8 is made different in accordance with a sector construction. Recording data from the recording processing circuit 8 is recorded onto an optical disc 2 by an optical pickup 10.

6 Claims, 11 Drawing Sheets

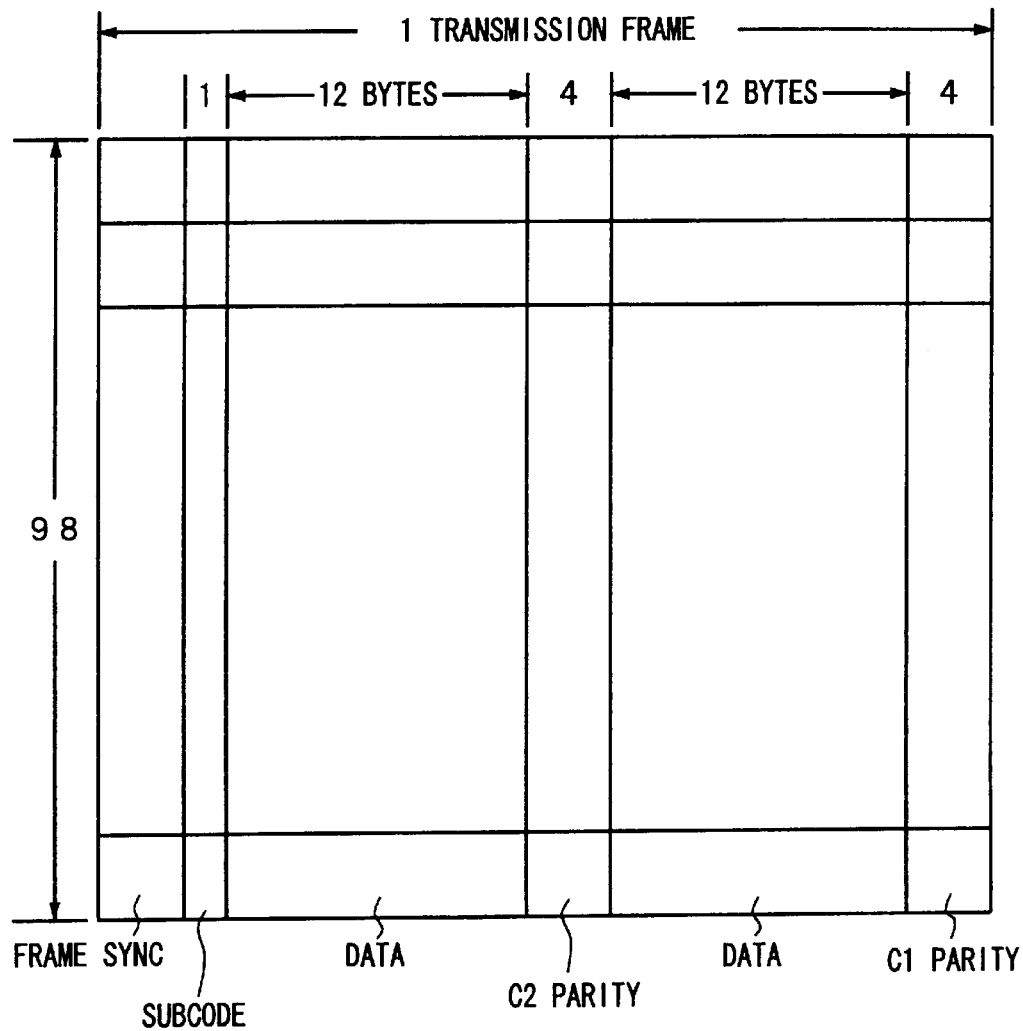

Fig. 4A
(PRIOR ART)

CD-ROM MODE 1

| SYNC SIGNAL (12) | HEADER / BLOCK ADDRESS: MINUTE (1), SECOND (1), BLOCK (1); MODE 1 (1) | USER DATA (2,048) | ERROR DETECTION CODE (4) | SPACE ALL ZERO (8) | ERROR CORRECTION CODE: P PARITY (172), Q PARITY (104) |

Fig. 4B
(PRIOR ART)

CD-ROM MODE 2

| SYNC SIGNAL (12) | HEADER / BLOCK ADDRESS: MINUTE (1), SECOND (1), BLOCK (1); MODE 2 (1) | USER DATA (2,324) |

DATA REGION (SCRAMBLE REGION) (2,340)
2,352 BYTES (1/75 SECOND)

Fig. 5A
(PRIOR ART)

CD-ROM MODE 2 FORM 1

- SYNC SIGNAL (12)
- HEADER: BLOCK ADDRESS (MINUTE (1), SECOND (1), BLOCK (1)), MODE 2 (1)
- SUBHEADER (8)
- USER DATA (2,048)
- ERROR DETECTION CODE (4)
- ERROR CORRECTION CODE: P PARITY (172), Q PARITY (104)

Fig. 5B
(PRIOR ART)

CD-ROM MODE 2 FORM 2

- SYNC SIGNAL (12)
- HEADER: BLOCK ADDRESS (MINUTE (1), SECOND (1), BLOCK (1)), MODE 2 (1)
- SUBHEADER (8)
- USER DATA (2,336)
- RESERVE (4)

2,352 BYTES (1/75 SECOND)

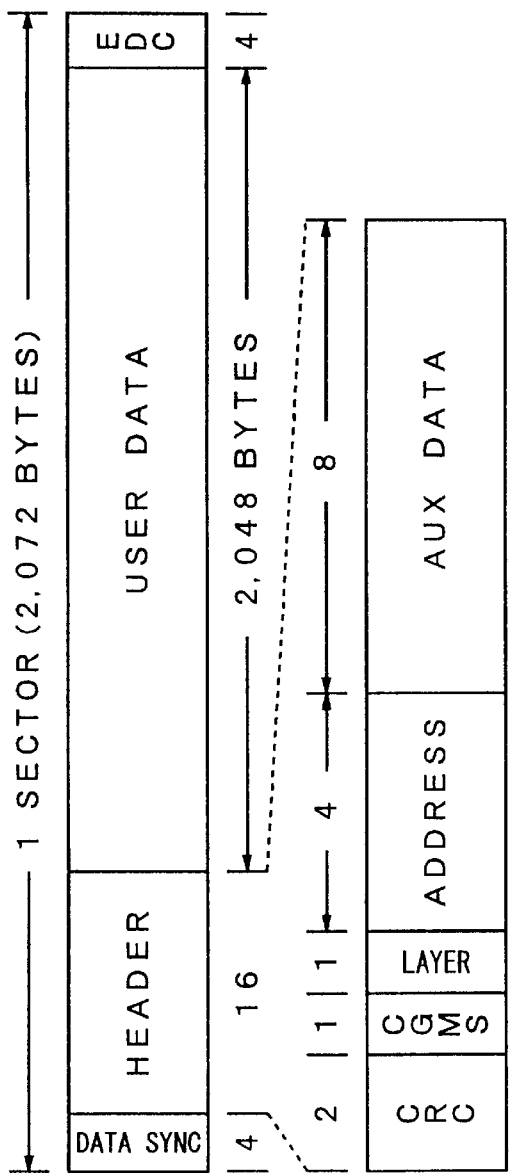
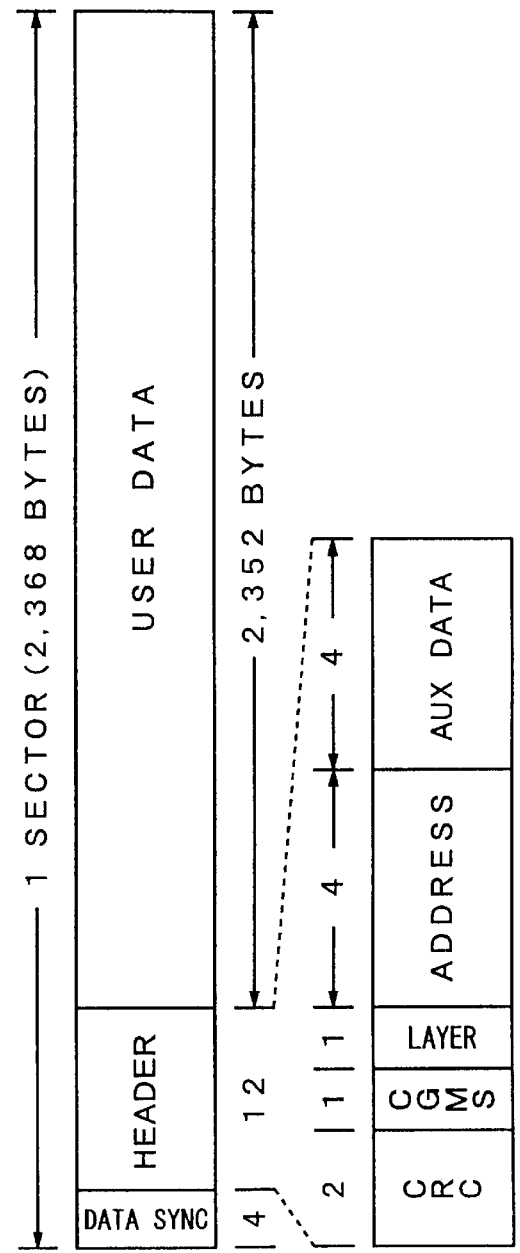
Fig. 6A  Fig. 6B  Fig. 7A  Fig. 7B

DATA RECORDING APPARATUS THAT IDENTIFIES THE TYPE OF DATA IN EACH BLOCK OF DATA

TECHNICAL FIELD

The invention relates to a data recording apparatus and method and a data reproducing apparatus which are applied when read data of, for example, a CD-ROM is recorded to another data recording medium and when data is reproduced from a data recording medium.

BACKGROUND ART

As an external storage device of a computer, an optical disc drive has several advantages such as large capacity and high speed access. The use of a CD-ROM [or CD-I (CD-Interactive)] drive and an MO (magnetooptic disc as one of erasable discs) is rapidly spreading. As a device other than those drives, an MD (minidisc; erasable disc) having a disc diameter of 2.5 inches has also been proposed. Further, a DVD (Digital Video Disc) is also being developed as a video storage medium.

The DVD is a recordable/reproducible optical disc like a read only disc, MO disc, or phase change type disc having the same diameter as that of a CD and is a disc in which video information compressed by an MPEG or the like can be reproduced or recorded/reproduced. In a DVD, the recording density is improved by improvements in digital modulation and an error correction coding together with the advancement of a short wavelength of a laser beam and the increase in NA of an objective lens. Even in the case of a single-layer disc, a data storage capacity is extremely large to be about 3.7 Gbytes. In a manner similar to that the CD and MD have initially been developed as digital audio discs and are also subsequently used as an external storage medium of a computer, it is also expected that the DVD of a larger capacity is used as an external storage medium of a computer.

It is considered that data read out from the CD-ROM and data from a hard disc drive are recorded by using a storage medium of a large capacity such as a DVD or the like. Hitherto, in case of the external storage medium of the computer, since a sector size (512 bytes, 2 kbytes, etc.) of 128 bytes$\times 2^i$ is a main stream, the data of the CD-ROM is also ordinarily recorded by such a sector size.

Upon recording/reproduction of data, a reliability (magnitude of an error rate) of the data is peculiar to the recording medium and the operation to select processes upon recording in consideration of it is not performed. In case of data in which a high reliability is required, however, it is necessary to further perform a protection by an error correction code upon recording. Thus, a redundancy of data increases and a recording capacity substantially decreases. Even when a significance of data is high, it is also necessary to strongly take a countermeasure for errors. Further, as in case of the CD-ROM, since there is a possibility such that data to be recorded has a plurality of formats (called modes), it is desirable to take a countermeasure for the errors in consideration of the formats.

It is, therefore, an object of the invention to provide a data recording apparatus and method and a data reproducing apparatus which can change a recording process in accordance with a reliability of data or the like.

DISCLOSURE OF INVENTION

To accomplish the above object, according to the invention, there is provided a data recording apparatus for recording digital data to a data recording medium, comprising:

input means for receiving data to which a first error correction code was added and instruction information;

sector segmenting means for selectively executing an error correction using the first error correction code to the inputted data and converting the data into data comprising sectors each having a predetermined size;

coding means for adding a second error correction code to perform an error correction to the sector segmented data to the data outputted from the sector segmenting means;

modulating means for performing a predetermined digital modulation to the data to which the second error correction code was added;

recording means for recording the modulated data to the data recording medium; and means to which the instruction information is inputted and which controls the sector segmenting means so as to selectively add the first error correction code to the data from the input means on the basis of the instruction information.

According to the invention, there is also provided a data recording apparatus for recording digital data to a data recording medium, comprising:

input means for receiving data and instruction information from an outside;

sector segmenting means for selectively adding a first error correction code to perform an error correction to the inputted data to the data and converting into data constructed by one of a plurality of kinds of sectors of different sizes;

coding means for adding a second error correction code to perform an error correction to the sector segmented data to the data outputted from the sector segmenting means;

modulating means for performing a predetermined digital modulation to the data to which the second error correction code was added;

recording means for recording the modulated data to the data recording medium; and means to which the instruction information is inputted and which controls the sector segmenting means so as to selectively add the first error correction code to the data from the input means on the basis of the instruction information.

Further, according to the invention, there is provided a data reproducing apparatus for reproducing data from a data recording medium on which predetermined data has been converted into data of a plurality of kinds of sector structures and recorded on the basis of instruction information, comprising:

means for reproducing the data from the data recording medium;

demodulating means for performing a digital demodulation to the reproduced data;

correcting means for performing an error correction by using a first error correction code included in the data to the demodulated data;

means for desegmenting the data from the correcting means every sector and outputting;

means for detecting identification information corresponding to the instruction information from the data reproduced by the reproducing means; and means for controlling the output means so as to desegment one of the data having the plurality of kinds of sector structures into data having a predetermined size on the basis of the detected identification information.

According to the invention, there is further provided a data recording method of recording digital data onto a data recording medium, comprising the steps of:

receiving data and instruction information from an outside;

selectively adding a first error correction code to perform an error correction to the received data to the data and converting into data constructed by one of a plurality of kinds of sectors of different sizes;

adding a second error correction code to perform an error correction to the sector segmented data to the sector segmented data;

performing a predetermined digital modulation to the data to which the second error correction code was added;

recording the modulated data onto the data recording medium; and receiving the instruction information and selectively adding the first error correction code to the data from input means on the basis of the instruction information.

According to the foregoing invention, there are selected: processes such that CD-ROM data which was coded by an error correction code of, for example, a CD-ROM is received, the error correction code is decoded and sector segmented into 2-kbyte sectors by instruction information in consideration of a reliability, a significance, a recording capacity, or a mode which is required, and the segmented sectors are recorded; and processes such that a format of the CD-ROM data is stored and sector segmented. The data recorded as mentioned above is reproduced from a recording medium and is subjected to a sector desegmenting process corresponding to the process upon recording and is outputted as CD-ROM data.

In accordance with instruction information, there are selected: processes such that data of a 2-kbyte sector constructed by user data of bytes which are integer times as large as 512 bytes, namely, 2048 bytes is received and sector segmented into 2-kbyte sectors in consideration of a reliability, a significance, a recording capacity, or a mode of the received data and the segmented sectors are recorded; and processes such that the data is coded as CD-ROM data and the coded data is sector segmented. The data recorded as mentioned above is reproduced from a recording medium and is subjected to a sector desegmenting process corresponding to the process upon recording and is outputted as data of 2 kbytes.

BRIEF DESCRIPTION OF DRAWINGS

FIG. 3 is a schematic diagram for explaining a data structure of a conventional CD.

FIGS. 4A and 4B is a schematic diagrams for explaining data structures of a conventional CD-ROM.

FIGS. 5A and 5B is a schematic diagrams for explaining data structures in mode 2 of a conventional CD-ROM.

FIGS. 6A and 6B are schematic diagrams showing an example of a data structure of a 2-kbyte sector in the embodiment of the invention.

FIGS. 7A and 7B are schematic diagrams showing an example of a data structure of a CD-ROM sector in the embodiment of the invention.

BEST MODE FOR CARRYING OUT THE INVENTION

Figure 1:
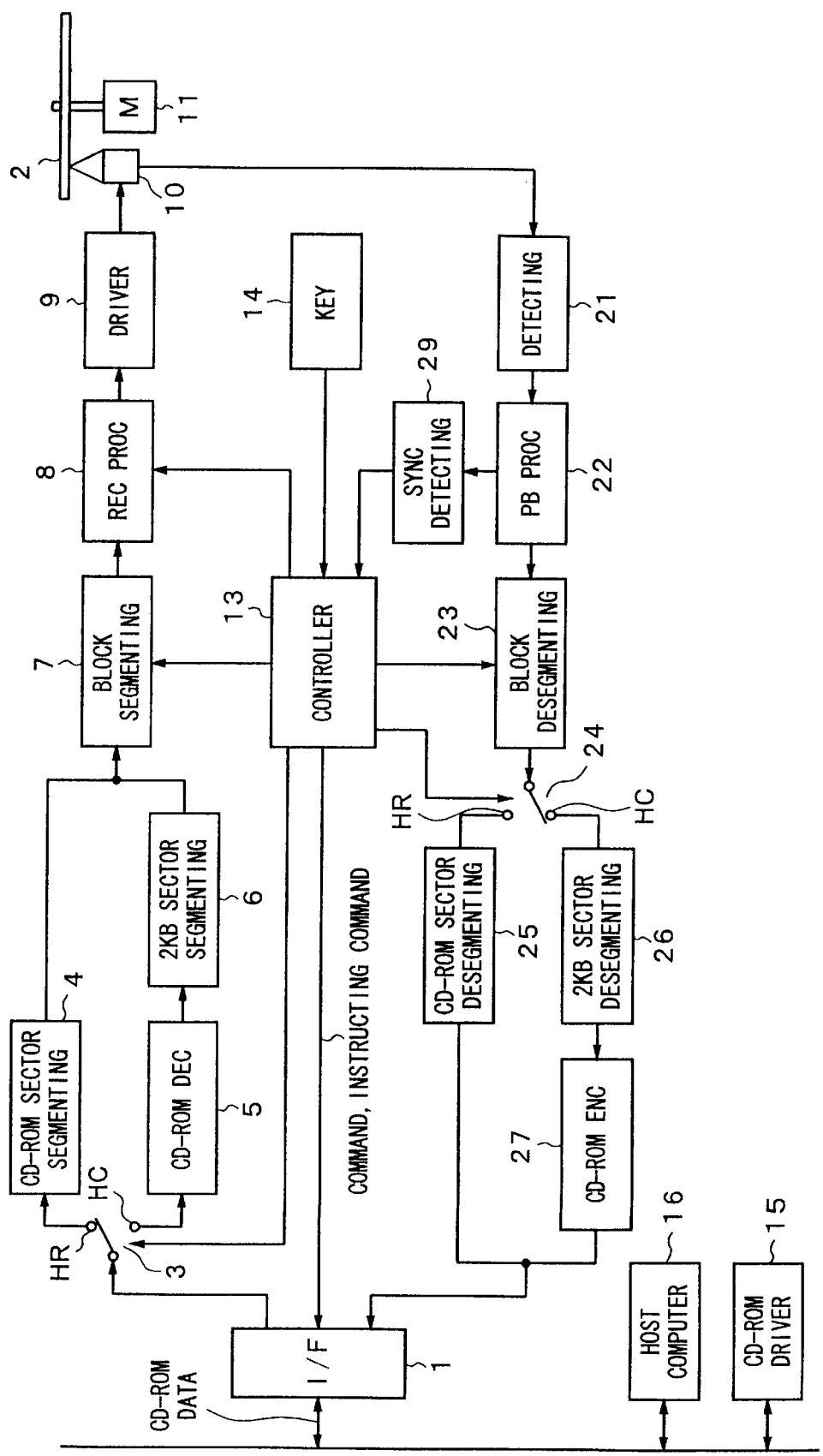
FIG. 1 is a block diagram of an embodiment of a recording/reproducing circuit according to the invention.

An embodiment of the invention will now be described hereinbelow with reference to the drawings. FIG. 1 shows an optical disc recording/reproducing system according to the invention. According to the embodiment, CD-ROM data which is supplied through an interface 1 is recorded onto an optical disc 2, and data read out from the optical disc 2 is outputted through the interface 1. A CD-ROM drive 15 and a host computer 16 are connected to the interface 1. The CD-ROM data is directly supplied from the drive 15 to the interface 1, or output data of the drive 15 is once inputted to the computer 16 and is supplied from the computer 16 to the interface 1. As a specific example of data, there is compressed video data, compressed audio data, data for a computer, or the like. A recordable type (disc of a magnetooptic type or phase change type) of the DVD which is at present proposed is an example of the optical disc 2.

The CD-ROM data to which the invention can be applied will now be described. The CD-ROM is a device developed from the well-known CD. As shown in FIG. 3, according to the CD, a subcode of one byte, data of 24 bytes, and a C1 parity and a C2 parity each consisting of 4 bytes are arranged in a transmission frame (also called an EFM frame or a C1 frame). Each byte is converted into a code word of 14 channel bits by an EFM modulation and recorded onto the CD through coupling bits (3 channel bits). Further, an inversion interval of 11T (T denotes a period of the channel bits) continues at the head of each transmission frame. After that, a sync (denotes a synchronization signal) of total 24 channel bits to which 2 channel bits were added is added.

The subcode is constructed so that 98 transmission frames are set as a period to one unit. Therefore, according to the CD, the user data of 24 bytes×98=2,352 bytes is included in the 98 transmission frames. A data structure of the CD-ROM is specified on the basis of such a transmission format of the CD. Namely, in the CD-ROM, 2,352 bytes as data included in 98 frames of the period of the subcode are set to a data unit.

In the CD-ROM, mode 0, mode 1, and mode 2 are specified. A sync (12 bytes) indicative of a delimiter of the sectors and a header (4 bytes) are added commonly for those modes. Mode 0 relates to data in which all portions other than the sync and header are equal to "0" and it is used as dummy data. FIGS. 4A and 4B show data structures of one sector in mode 1 and mode 2. The header is constructed by address information of 3 bytes and mode information of one byte in a manner similar to the subcode of the CD.

In the data structure of mode 1, the user data consists of 2,048 (2 k) bytes and auxiliary data of 288 bytes are added in order to raise an error correcting ability. That is, an error detection code (4 bytes), a space (corresponding to 8 bytes), a P parity (172 bytes), and a Q parity (104 bytes) are added. Mode 1 is suitable for recording data such as character code, computer data, or the like in which a high reliability is required. Mode 2 is a mode in which the auxiliary data of 288 bytes is not added, therefore, the user data of 2,336 bytes can be recorded. Mode 2 is suitable for recording data such as video data or audio data whose errors can be interpolated.

Further, as a modification of mode 2 of the CD-ROM, form 1 and form 2 as shown in FIGS. 5A and 5B have been specified. A CD-I, a CD-ROM XA, a video CD, or the like has data structures of form 1 and form 2. In form 1 and form 2, in a manner similar to the CD-ROM, a sync of 12 bytes and a header of 4 bytes are added and mode information in the header is set to mode 2. After the header, a subheader of 8 bytes is added. The subheader is constructed by a final number, a channel number, a submode, and a data type each consisting of 2 bytes.

In form 1, further, an error detection code of 4 bytes, a P parity of 172 bytes, and a Q parity of 104 bytes are added. The space in mode 1 of the CD-ROM doesn't exist and an area of the user data is set to 2,048 bytes. In form 2, a reserve area (4 bytes) is provided and the area of the user data is set to 2,324 bytes.

Among the plurality of modes of the CD-ROM mentioned above, the CD-ROM data of the data structure (mode 1 or mode 2·form 1) specified so that the user data of 2 kbytes is protected by the error correction code is received from the interface 1.

According to the embodiment of the invention, when CD-ROM data is recorded to the optical disc 2, two kinds of sector structures can be selected. One is a sector structure (called a CD-ROM sector) in which the format of the CD-ROM data, particularly, an error correction code (P parity and Q parity) is preserved. The other is a sector structure (called a 2-kbyte sector) which is formed by the data obtained by decoding the CD-ROM data and in which 2 kbytes are set to a unit.

Which one of the two sector structures is selected is determined in consideration of a reliability, a significance, a recording capacity, or a mode of the data. To raise the reliability of the data or when the significance of the data is high, the CD-ROM data is sector segmented into the CD-ROM sectors. For example, when the CD-ROM data is data of computer software, the CD-ROM data is sector segmented into CD-ROM sectors. When a high reliability of the data is not so required or to increase the recording capacity, the CD-ROM data is sector segmented into 2-kbyte sectors. In case of the image data or music data, after the data was reproduced, it can be also interpolated. Therefore, a high reliability of the data is not so necessary.

A data structure of the 2-kbyte sector will now be described. As shown in FIG. 6A, a data sync (4 bytes) and a header (16 bytes) are added to the user data of 2,048 (=2 k) bytes in one sector of the CD-ROM data and an error detection code EDC (4 bytes) to detect the presence or absence of errors is added. Therefore, a length of one sector is equal to 2,072 bytes. The sector having the data structure shown in FIG. 6A is called a 2-kbyte sector.

FIG. 6B shows the data of the header in more detail. That is, the header is constructed by: 2 bytes of the error detection code (specifically, CRC) for the header; 1 byte of management information CGMS to manage a permission or an inhibition of the copy; 1 byte of a layer which discriminates a single-layer disc and a multi-layer disc and shows the number of layers included in the disc and the number of the layer in which data has been recorded; 4 bytes of an address; and 8 bytes of auxiliary data. As necessary, a sector ID signal to identify the sector structure (2-kbyte sector or CD-ROM sector) is inserted into the auxiliary data.

Figure 8:
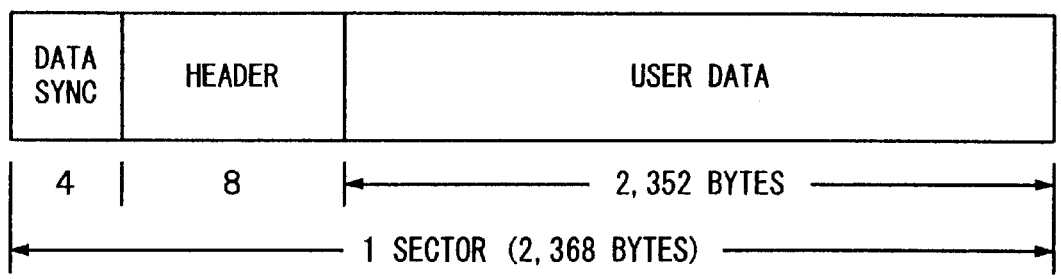
FIG. 8 is a schematic diagram showing another example of a data structure of a CD-ROM sector in the embodiment of the invention.

As mentioned above, in the CD-ROM data, since a length of 2,352 bytes is set to one sector, a data sync (4 bytes) and a header (12 bytes) are added to those 2,352 bytes as shown in FIG. 7A. Therefore, a length of one sector is equal to 2,368 bytes. As enlargedly shown in FIG. 7B, the header is constructed by a CRC (2 bytes), copy management information CGMS, a layer, an address, and auxiliary data (4 bytes). The header in FIG. 7B has substantially the same information as the header shown in FIG. 6B except that the length of auxiliary data is short. A sector including one sector of the CD-ROM data is called a CD-ROM sector. As a CD-ROM sector in which a sector size is equal to 2,368 bytes, as shown in FIG. 8, a format in which an error detection code (EDC) of 4 bytes is added can be also used.

The foregoing formats of the 2-kbyte sector and CD-ROM sector are shown as an example. There are various values of the number of bytes of the sector size, data sync, and header. It is also possible to use a construction in which no data sync is added.

Further, although the data of 2 kbytes is included in one sector, data of the number of bytes that is integer times as large as 128 bytes or 512 bytes can be also included in the sector. For example, it is also possible to specify a sector structure including data of (512×2)=1,024 (=1 k) bytes and to divide the user data of the CD-ROM data into two 1-kbyte sectors and to record them.

As mentioned above, the length of one sector of the 2-kbyte sector and the length of the CD-ROM sector are different and there is no relation of an integer ratio between them. According to the embodiment of the invention, now assuming that those sector sizes are set to A and B, blocks of sizes which satisfy a relation between nA and mB (n and m are integers; n≠m, n>m) are specified. The data is recorded/reproduced (namely, accessed) on a block unit basis.

In the foregoing example, since A =2,072 bytes and B=2,368 bytes, n=8 and m=7 are selected. Therefore, the block sizes are as follows.

$$2{,}072 \times 8 = 2{,}368 \times 7 = 16{,}576 \text{ bytes}$$

The common block size can be specified.

Figure 9:
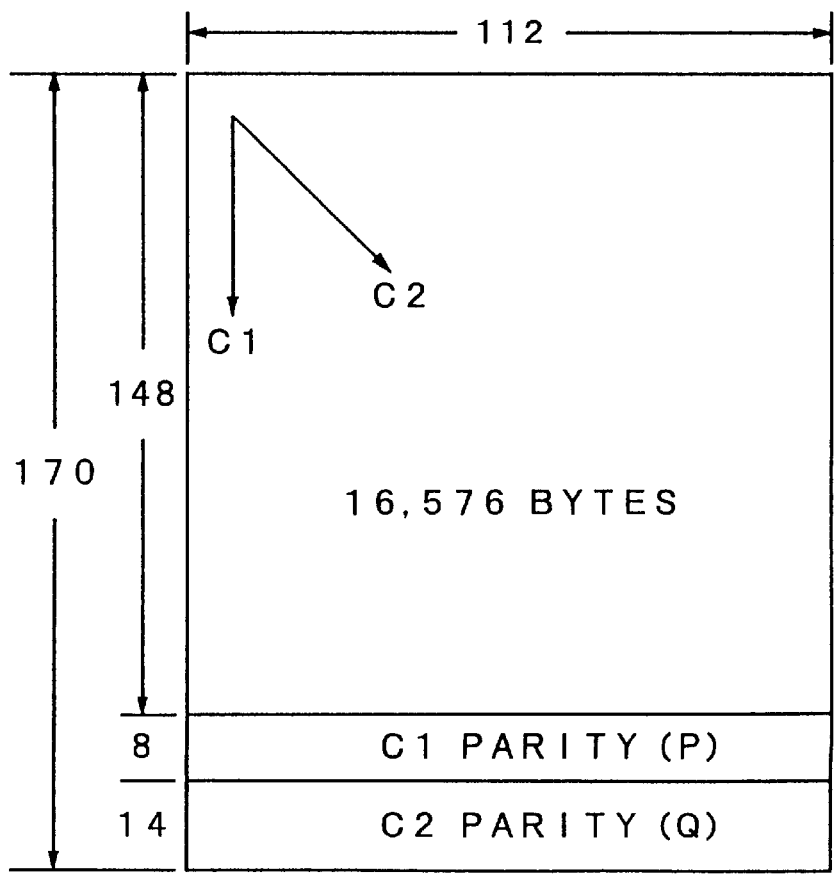
FIG. 9 is a schematic diagram which is used for explanation of an error correction code of a block unit in the embodiment of the invention.

As a data structure of one block in this case, a two-dimensional arrangement of (148×112=16,576 bytes) is specified as shown in FIG. 9. By applying the error correction code to the 2-dimensional arrangement, an error correcting ability can be raised. As an error correction code, a coding of a first error correction code (referred to as a C1 code) is executed to 162 bytes in the vertical direction (each column) and a C1 parity of 8 bytes is formed. A coding of a second error correction code (referred to as a C2 code) is performed to 156 bytes in the oblique direction and a C2 parity of 14 bytes is added. Those error correction codings are a double coding of a convolution type.

As error correction codes other than those codes, it is also possible to use a product code, a double coding of a block completion type, an LDC (Long Distance Code), or the like. A coding by a simple error detection code can be also performed.

Figure 10A:
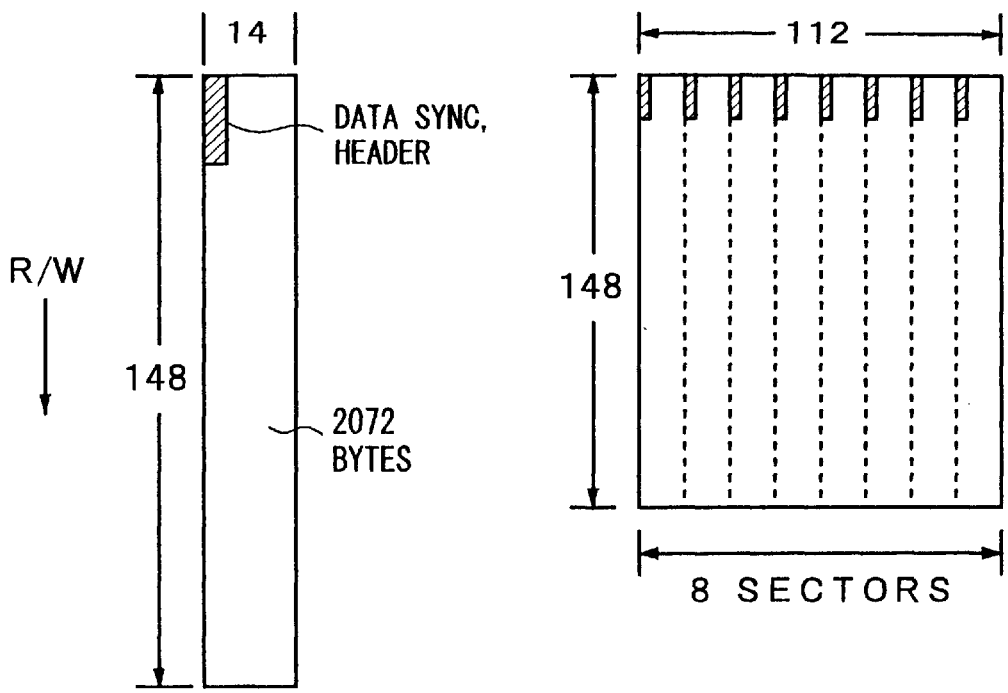
FIGS. 10A and 10B are schematic diagrams which is used for explanation of block constructions in the embodiment of the invention.

A case of integrating two sectors of different sizes to the block of the same size will be more specifically explained with reference to FIGS. 10A and 10B. FIG. 10A shows processes regarding the sector of 2,072 bytes shown in FIGS. 6A and 6B. One sector is divided in the R/W direction every 148 bytes, thereby forming a two-dimensional arrangement of (148×14)=2,072 bytes. Therefore, as for one sector of the above arrangement, a data structure in which eight sectors are included in one block and one block is formed by eight sectors is formed.

Figure 10B:
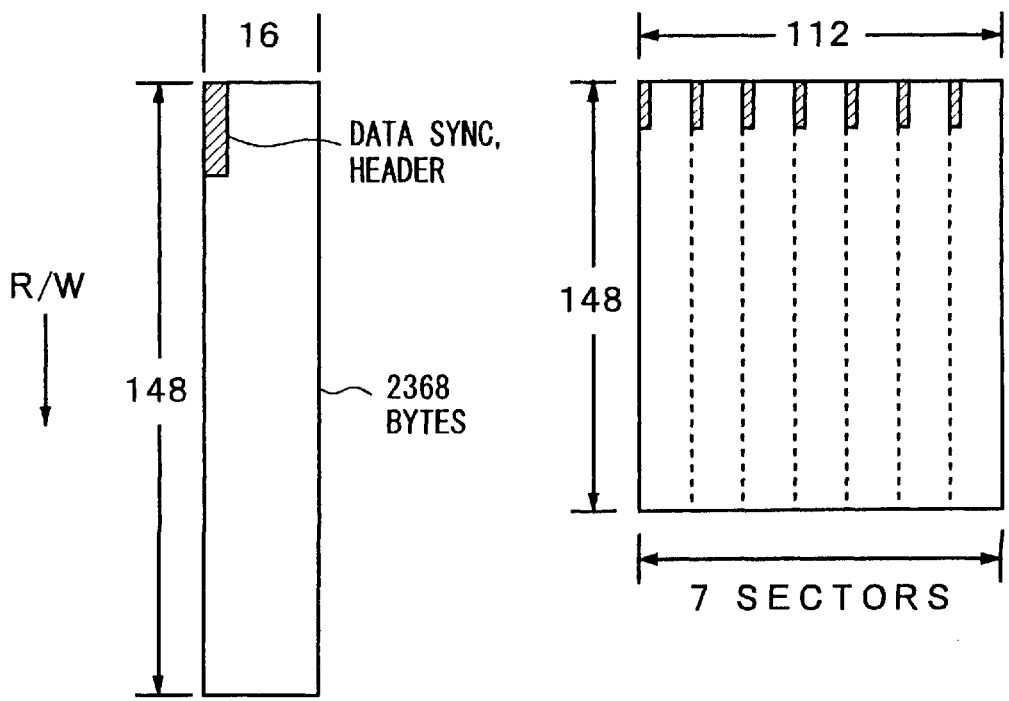

FIG. 10B shows processes regarding the sector of 2,368 bytes shown in FIGS. 7A and 7B. One sector is divided in the R/W direction every 148 bytes and a 2-dimensional arrangement of (148×16)=2,368 bytes is formed. Therefore, as for one sector of the above arrangement, a data structure in which seven sectors are included in one block and one block is constructed by seven sectors is formed.

Returning to FIG. 1, a recording/reproducing circuit of the embodiment of the invention will now be described. Digital data received by the interface 1 is supplied from the interface 1 to a CD-ROM sector segmenting circuit 4 and a CD-ROM decoder 5 through a switching circuit 3. The sector segmenting circuit 4 is connected to one output terminal HR of the switching circuit 3 and the decoder 5 is connected to another output terminal HC. A decoding output of the CD-ROM decoder 5 is supplied to a 2-kbyte sector segmenting circuit 6.

Each of the sector segmenting circuits 4 and 6 divides the received digital data every sector, adds a sector sync and a header, and executes an error detection coding. Namely, the sector segmenting circuit 4 converts the received data into a CD-ROM sector structure of a size of 2,368 bytes as shown in FIG. 7A. The sector segmenting circuit 6 converts the received data into a 2-kbyte sector structure of a size of 2,072 bytes as shown in FIG. 6A. The CD-ROM decoder 5 performs an error correction to one sector of the CD-ROM data and generates 2 kbytes of the user data after completion of the error correction. The sector segmenting circuit 4 has a construction such that one sector of the CD-ROM data is converted as it is into the CD-ROM sector without performing the error correction or a construction such that the received CD-ROM data is once decoded by the error correction code of the CD-ROM and is again converted into a data structure of the CD-ROM in a manner similar to the CD-ROM decoder 5. In order to further raise a reliability of the data, processes for decoding and coding the data of the CD-ROM are preferable. The details are disclosed in the specification of U.S. Pat. No. 33,462 issued again in the U.S.A. (JP-B-7-101543).

The switching circuit 3 is controlled by a control signal which is outputted from a controller 13 connected to the interface 1. The interface 1 receives an instruction command which is supplied from the host computer 16 together with the CD-ROM data. As another method of generating instruction information, there is an operation by the user on a keyboard 14. As still another method of generating the instruction information, the instruction information can be also formed in accordance with the presence or absence of errors of the received data. That is, it is also possible to construct such that the received data is once supplied to the CD-ROM decoder and in accordance with a result of the error correction in the CD-ROM decoder, when there are errors, the CD-ROM sector segmentation is performed and when there is no error, the 2-kbyte sector segmentation is performed. Further, as necessary, a control signal to control the switching circuit 3 is supplied to the sector segmenting circuits 4 and 6 and the control signal is inserted as a part of, for example, the auxiliary data into the header of each sector.

A selected one of the output data of the sector segmenting circuits 4 and 6 is supplied to a block segmenting circuit 7. As shown in FIGS. 10A and 10B, the block segmenting circuit 7 constructs a block (16,576 bytes) consisting of 7 sectors (in case of the CD-ROM sector) or 8 sectors (in case of the 2-kbyte sector) in correspondence to the sector size of the inputted data and executes a coding of the error correction code of every block as shown in FIG. 9. A controller 13 gives a signal to instruct a sector size to the block segmenting circuit 7. The error correction code differs from the error correction code which has inherently been allocated to the CD-ROM data.

Data from the block segmenting circuit 7 is supplied to a recording processing circuit 8. The recording processing circuit 8 executes processes such as error correction coding, digital modulation, addition of a sync signal (frame sync), and the like. In order to enable the structure of the sector to be identified in accordance with a pattern of the sync signal which is added, a signal to instruct the sector structure is supplied from the controller 3 to the recording processing circuit 8.

Recording data from the recording processing circuit 8 is supplied to an optical pickup 10 through a driver 9 and is recorded onto the optical disc 2. The recording is performed by a magnetooptic recording or a phase change. The optical disc 2 is rotated by a spindle motor 11 at a CLV (constant linear velocity) or CAV (constant angular velocity). The minimum unit of the data which is recorded/reproduced by the optical pickup 10 is set to one sector mentioned above.

The reproduction data which is read out by the optical pickup 10 is supplied to a detecting circuit 21 including an RF amplifier, a PLL circuit for clock extraction, and the like. An output of the detecting circuit 21 is supplied to a reproduction processing circuit 22. A focusing servo, a tracking servo, a control of a feeding operation (seek), a control of a laser power upon recording, and the like of the optical pickup are executed on the basis of the output of the optical pickup 10.

The reproduction processing circuit 22 is constructed by a sync separating circuit, a digital demodulating circuit, an error correcting circuit, and the like. The reproduction data from the detecting circuit 21 is supplied to the sync separating circuit and the frame sync is separated. A clock signal synchronized with the reproduction data is formed from the separated frame sync. The digital demodulating circuit executes processes opposite to those of the digital modulating circuit. Data in which one symbol is returned to one byte is generated from the demodulating circuit. Output data of the digital demodulating circuit is supplied to the error correcting circuit and an error correction of the reproduction data is executed by the error correcting circuit.

A block desegmenting circuit 23 is connected to the reproduction processing circuit 22. In the block desegmenting circuit 23, the reproduction data is divided every block and a decoding of the error correction code of the block is performed. The block desegmenting circuit 23 executes processes opposite to the processes of the block segmenting circuit 7 on the recording side. The block desegmenting circuit 23 outputs the data of the sector structure.

The output data of the block desegmenting circuit 23 is distributed to output terminals HR and HC by a switching circuit 24, respectively. A CD-ROM sector desegmenting circuit 25 is connected to the output terminal HR. A 2-kbyte sector desegmenting circuit 26 is connected to the output terminal HC. A CD-ROM encoder 27 is connected to the sector desegmenting circuit 26. Output data of the CD-ROM sector desegmenting circuit 25 or output data of the CD-ROM encoder 27 is supplied to the interface 1.

A sync detecting circuit 29 is connected in conjunction with the reproduction processing circuit 22. When the sector structure is identified by the sync pattern, the sync detecting circuit 29 generates a sector discrimination signal in correspondence to the pattern of the separated sync. The sector discrimination signal is supplied to the controller 13. A signal to control the block desegmenting circuit 23 and a signal to control the switching circuit 24 are generated from the controller 13. Those control signals can be also formed on the basis of the instruction command which is supplied to the interface 1 together with a read command. Further, the controller 13 can also generate instruction information on the basis of the operation of the user in the keyboard 14.

The CD-ROM sector desegmenting circuit 25 separates and outputs the CD-ROM data of 2,352 bytes from the CD-ROM sector shown in FIG. 7A. If a high reliability is requested, after the CD-ROM data was separated, an error correction is performed by the CD-ROM decoder and the CD-ROM data is formed by the CD-ROM encoder.

The 2-kbyte sector desegmenting circuit 26 separates the data of 2,048 bytes from the 2-kbyte sector shown in FIG. 6A. The CD-ROM encoder 27 uses the data of 2,048 bytes from the sector desegmenting circuit 26 as user data and forms the CD-ROM data (refer to FIG. 4) in mode 1 or the CD-ROM data (refer to FIG. 5) in mode 2·form 1. The reproduction data converted into the CD-ROM data as mentioned above is transferred to the host computer 16 through the interface 1.

Figure 11:
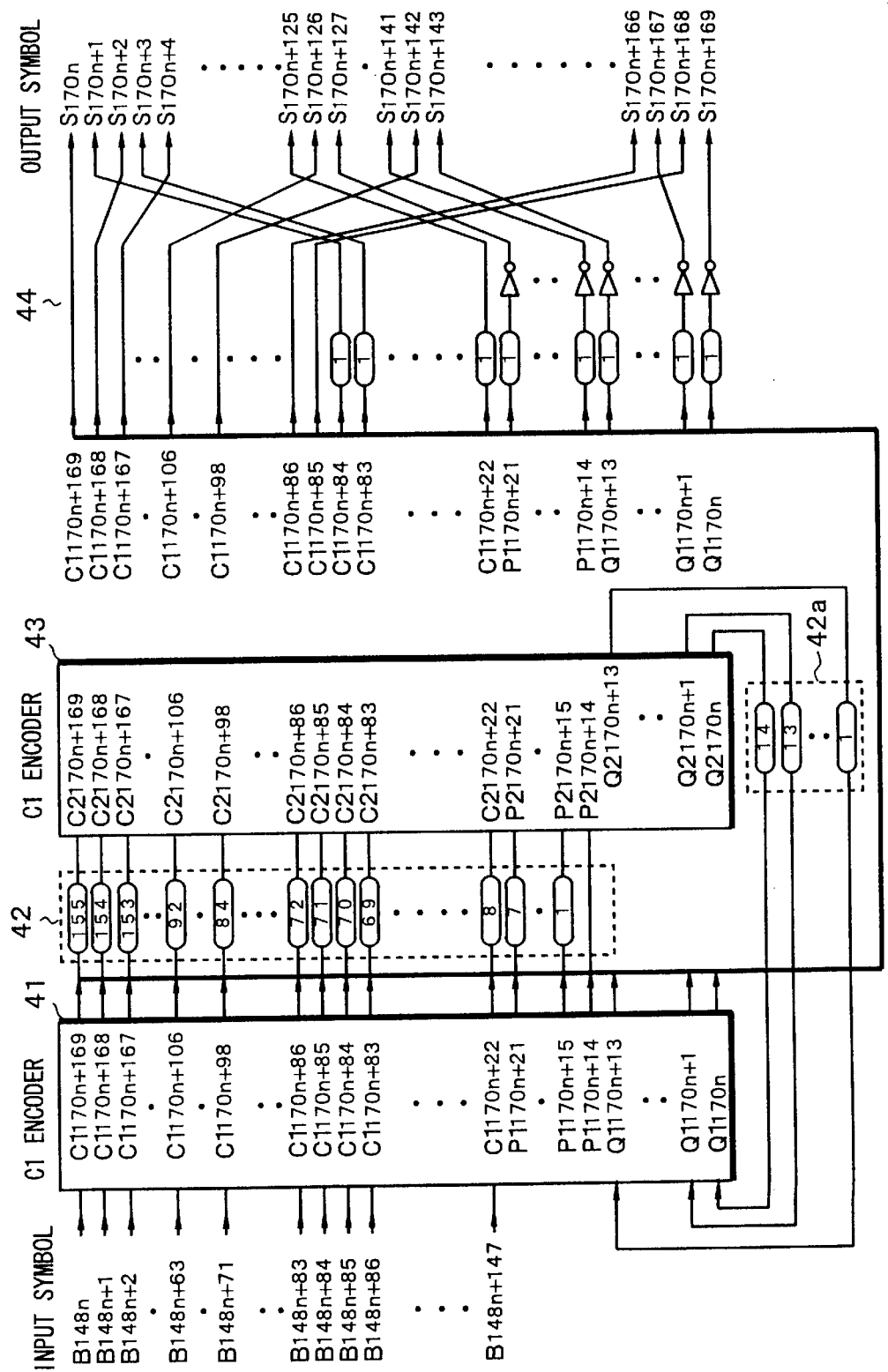
FIG. 11 is a block diagram of an example of an encoder of the error correction code for recording data in the embodiment of the invention.

An example of the error correction code which is used in the recording processing circuit 8 and reproduction processing circuit 22 will now be described. FIG. 11 is a block diagram showing processes for coding of the error correction code which is performed by an encoder of the error correction code provided in the recording processing circuit 8. The error correction code is similar to a Cross Interleave Reed Solomon code (example of double coding of the convolution type) used in the CD.

As shown in FIG. 11, input symbols of 148 bytes are supplied to a C1 encoder 41. An output (data symbols of 148 bytes and C1 parity P of 8 bytes) of the C1 encoder 41 is supplied to a C2 encoder 43 through a group of delay circuits 42 for interleave. In the C2 encoder 43, a C2 parity Q of 14 bytes is formed by the coding of a [170, 156, 15] Reed Solomon code. In the C1 encoder 41, since not only the data but also the C2 parity Q are C1 coded, the C2 parity Q is fed back from the C2 encoder 43 to the C1 encoder 41 through a group of delay circuits 42a. Therefore, the C1 encoder 41 performs a coding of a [170, 162, 9] Reed Solomon code.

170 bytes (consisting of the data of 148 bytes, the C1 parity of 8 bytes, and the C2 parity of 14 bytes) from the C1 encoder 41 are extracted as output symbols through an arrangement changing circuit 44 including a delay circuit. The output symbols are supplied to the digital modulating circuit. An interleave length (also referred to as a restriction length of interleave or a depth of interleave) of the double coding of the convolution type is set to 170 frames (frame indicates a length of C1 code series and denotes two frames of the transmission frame) in correspondence to the maximum delay amount by the delay circuit.

Figure 12:
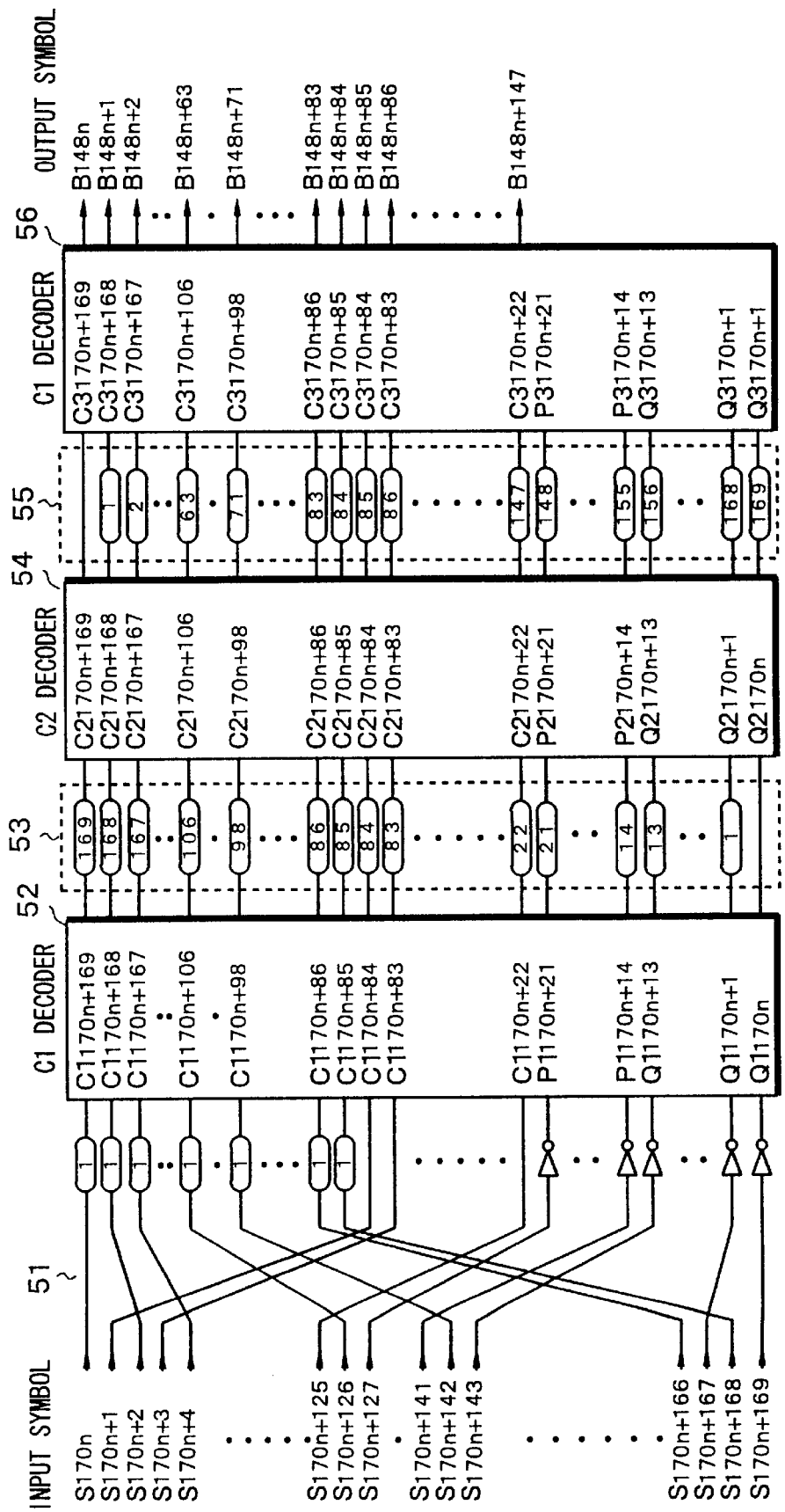
FIG. 12 is a block diagram of an example of a decoder of the error correction code for recording data in the embodiment of the invention.

Processes of a decoder corresponding to the encoder shown in FIG. 11 will now be described with reference to FIG. 12. FIG. 12 is a block diagram showing processes of the decoder of the error correction code provided in the reproduction processing circuit 22. Input symbols (170 bytes) from the digital demodulating circuit are supplied to a C1 decoder 2 through an arrangement changing circuit 51. The arrangement changing circuit 51 executes processes opposite to those of the arrangement changing circuit 44 of the encoder. The C1 decoder 52 performs a decoding of a [170, 162, 9] Reed Solomon code.

An output of the C1 decoder 52 is supplied to a C2 decoder 54 through a group of delay circuits 53. The C2 decoder 54 performs a decoding of a [170, 156, 15] Reed Solomon code. Further, a decoding output of the C2 decoder 54 is supplied to a C1 decoder 56 through a group of delay circuits 55 for deinterleave. Output symbols of 148 bytes which were error corrected by the processes of the C1 decoding, C2 decoding, and C1 decoding as mentioned above are extracted.

Figure 13A:
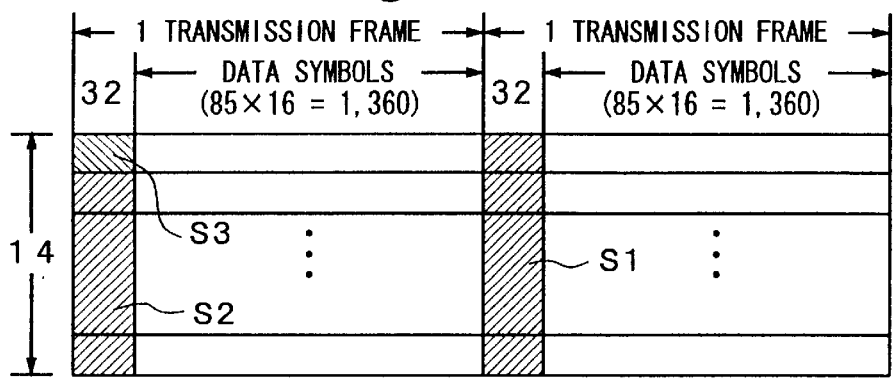
FIGS. 13A to 13C are schematic diagrams showing constructions of recording data after completion of a modulation in the embodiment of the invention.

Recording data which is outputted from the recording processing circuit 8 will now be described with reference to FIGS. 13A to 13C. As mentioned above, the 2-kbyte sector (2072 bytes) is divided every 148 data (refer to FIG. 10A). The double coding of the convolution type is carried out to the data (refer to FIG. 9). The parity P of 8 bytes and the parity Q of 14 bytes are added. Therefore, (148+22=170) data symbols are formed. The data symbols are divided into 85 equal data symbols. The 85 data symbols are converted into (85×16=1,360) channel bits by a digital modulating circuit (for example, 8–16 modulation)

In a sync adding circuit provided after the digital modulating circuit, a sector sync S3 or a C1 sync S2 of 32 channel bits is added to modulation data symbols of the former half. Thus, data of one transmission frame of (1,360+32=1,392 channel bits) is constructed. An additional sync S1 of 32 channel bits is added to modulation data symbols of the latter half and one transmission frame is similarly constructed. As shown in FIG. 13A, (14×2=28) transmission frames construct recording data of 2-kbyte sector. In place of the C1 sync S2, the sector sync S3 is added to the head transmission frame among the 28 transmission frames.

Figure 13B:
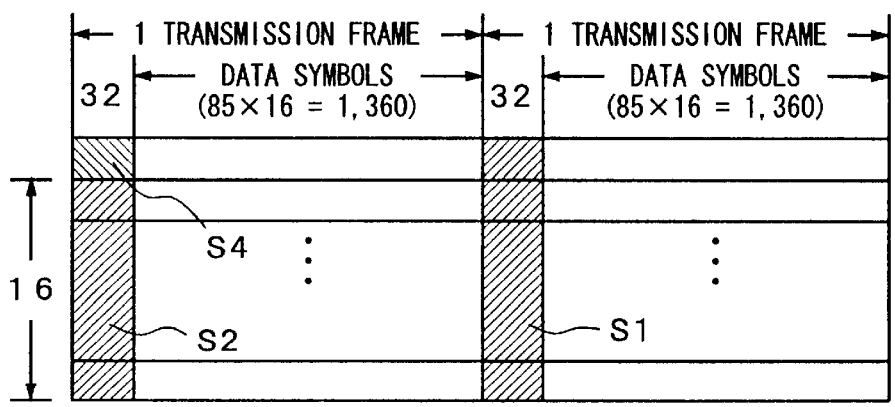

Recording data corresponding to one sector of the CD-ROM sector is shown in FIG. 13B. The recording data of one sector is constructed by (16×2=32) transmission frames of the same format as that of the recording data of 2-kbyte sector mentioned above. In the sync adding circuit, in place of the C1 sync S2, a sector sync S4 is added to the head transmission frame among those transmission frames.

Figure 13C:
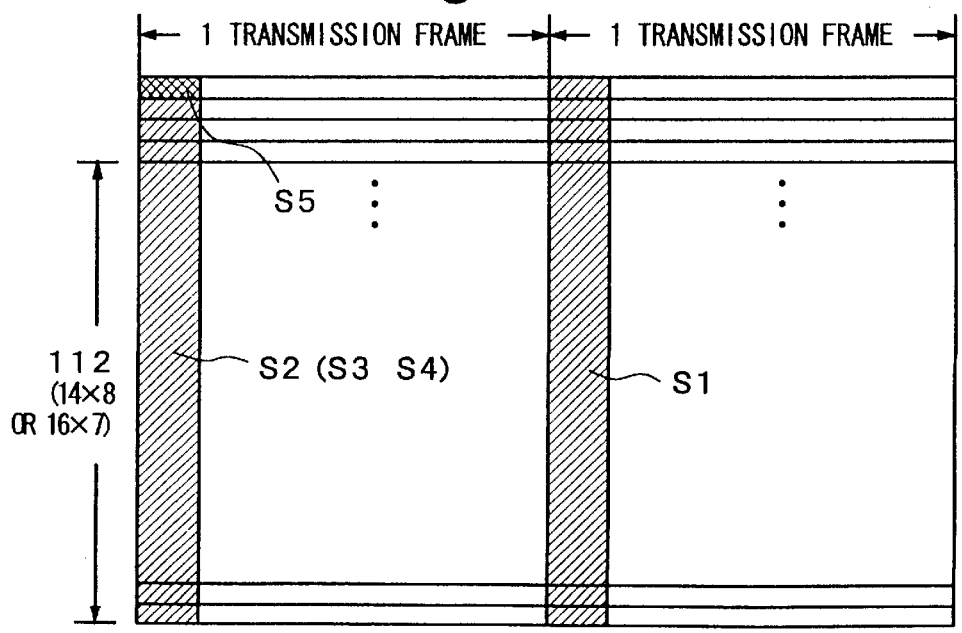

One method of adding the block sync on a block unit basis is, further, shown in FIG. 13C. As mentioned above, one block is constructed by eight 2-kbyte sectors or seven CD-ROM sectors. In the sync adding circuit, therefore, with respect to the head transmission frame of the head sector in one block, a block sync S5 is added in place of the sector sync S3 or S4. As for the head transmission frame of the other sector, the sector sync S3 or S4 is added. The block sync S5 can be also added independent of the sector sync.

As mentioned above, since S3 and S4 are prepared as sector syncs in the recording data, by setting those sector syncs into different bit patterns, the controller 13 can identify the sector structure from an output of the sync detecting circuit 29 (refer to FIG. 1). The sector structure can be also identified on a block unit basis by the bit pattern of the block sync S5 in place of the sector sync.

According to the embodiment of the invention mentioned above, when the CD-ROM data is received and a high reliability is requested, the data is sector segmented as a CD-ROM sector and the data of the CD-ROM sector is recorded onto the optical disc 2 and reproduced from the optical disc 2. When importance is attached to the recording capacity rather than the reliability, the received CD-ROM data is sector segmented as a 2-kbyte sector and the recording/reproduction are executed. In any of the above cases, the data which is inputted/outputted to/from the interface 1 has a format of the CD-ROM data. Two kinds of recording/reproducing operations can be carried out in accordance with the reliability.

Figure 2:
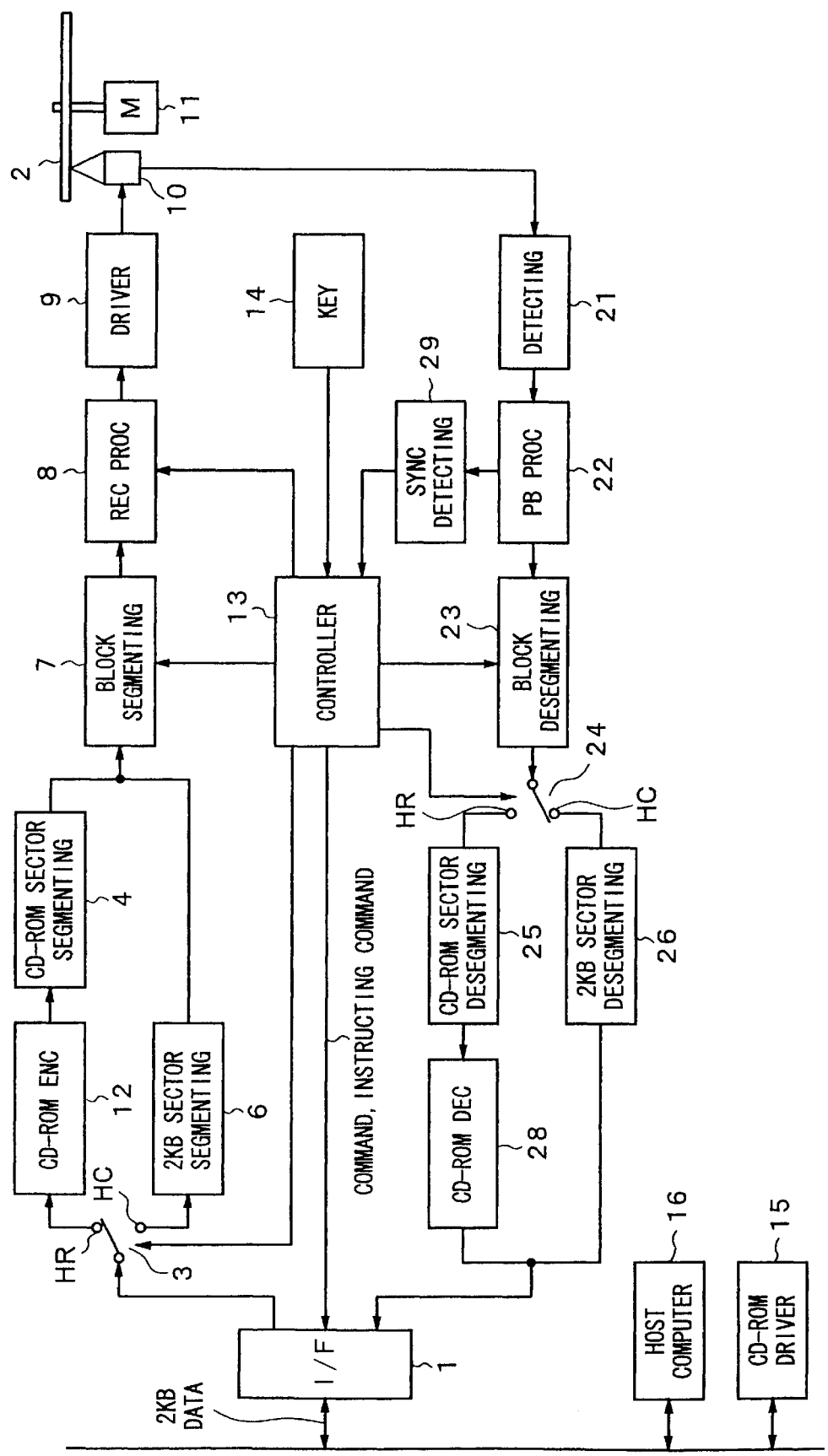
FIG. 2 is a block diagram of another embodiment of a recording/reproducing circuit according to the invention.

FIG. 2 shows a construction of a recording/reproducing system of another embodiment of the invention. A construction in a range from the block segmenting circuit 7 to the optical pickup 10 of the recording system and a construction in a range from the optical pickup 10 to the block desegmenting circuit 23 of the reproducing system are the same as those of the foregoing embodiment. Therefore, their descriptions are omitted.

According to another embodiment of the invention, digital data divided every 2 kbytes is supplied to the interface 1. The input data is distributed to the terminals HR and HC by the switching circuit 3. A CD-ROM encoder 12 is connected to the terminal HR that is selected when importance is attached to the high reliability. The CD-ROM sector segmenting circuit 4 is connected to the encoder 12. The 2-kbyte sector segmenting circuit 6 is connected to the terminal HC that is selected in case of increasing the recording capacity.

The CD-ROM encoder 12 forms the CD-ROM data of the format of mode 1 or mode 2·form 1 in which 2 kbytes of the input data are set to the user data. An output of the CD-ROM encoder 12 is supplied to the CD-ROM sector segmenting circuit 4 and a CD-ROM sector shown in FIG. 7A is formed. The 2-kbyte sector segmenting circuit 6 forms a 2-kbyte sector shown in FIG. 6A. The data converted into the structure of the CD-ROM sector or 2-kbyte sector is supplied to the block segmenting circuit 7.

The switching circuit 24 which is connected to the block desegmenting circuit 23 is controlled by a control signal from the controller 13 in a manner similar to the switching circuit 3 on the recording side. A CD-ROM decoder 28 is connected to the terminal HR of the switching circuit 24 through the CD-ROM sector desegmenting circuit 25. The 2-kbyte sector desegmenting circuit 26 is connected to the terminal HC of the switching circuit 24. On the recording side, the CD-ROM sector desegmenting circuit 25 and CD-ROM decoder 28 are provided in correspondence to that the CD-ROM encoder 12 and CD-ROM sector segmenting circuit 4 are provided. The 2-kbyte sector desegmenting circuit 26 is provided in correspondence to the 2-kbyte sector segmenting circuit 6 on the recording side.

According to another embodiment of the invention mentioned above, when the data of the 2-kbyte unit is received and the high reliability is requested, after the data was coded into the CD-ROM data, it is sector segmented as CD-ROM sectors, and the data of the CD-ROM sector is recorded onto the optical disc 2 and is reproduced from the optical disc 2. On the other hand, when importance is attached to the recording capacity rather than the reliability, the received 2-kbyte data is sector segmented as 2-kbyte sectors and the recording/reproduction are executed. In any of the above cases, the data that is inputted/outputted to/from the interface 1 is the data in which 2 kbytes are set to a unit. In this manner, two kinds of recording/reproducing operations can be performed in accordance with the reliability.

By combining the embodiment and another embodiment of the invention mentioned above, it is possible to cope with both of the CD-ROM data and the 2-kbyte data as input/output data.

Although the optical disc has been described above as an example, the invention can be similarly applied to a hard disc, a flexible disk (FD), further, a semiconductor memory, and a tape-shaped recording medium.

According to the invention, when recording the CD-ROM data from the CD-ROM drive or the data of the 2-kbyte unit from the hard disc drive, the recording process can be switched in accordance with the reliability that is required, the recording capacity that is required, or the like. Therefore, when the digital data is recorded, a flexibility can be provided. According to the invention, any one of the data of the 2-kbyte unit or the CD-ROM data can be used as data that is inputted/outputted.

Many modifications and variations are possible within the scope of the invention without departing from the spirit of the invention.

What is claimed is:

1. A data recording apparatus for recording digital data to a data recording medium, comprising:

input means for receiving input data to which a first error correction code was added, and instruction information, the instruction information being formed by data input by a user;

sector segmenting means for forming a plurality of sectors from the input data, the sectors having a plurality of structures that include a first sector structure which is formed when the instruction information indicates that the input data is a first type, and a second sector structure which is formed when the instruction information indicates that the input data is a second type, the sector segmenting means executing an error correction using the first error correction code on the input data when the input data is the first type to form first corrected data, each sector having a multi-byte header;

block segmentation means for forming a plurality of block units from the sectors, the block units having a plurality of structures that include a first block structure which includes a plurality of sectors having the first sector structure, and a second block structure which includes a plurality of sectors having the second sector structure, the block segmentation means including coding means for adding a second error correction code to each block unit;

recording processing means for performing a predetermined digital modulation to the data to which the second error correction code was added, the recording processing means forming a block synch in each block unit, the block synch identifying a type of sector structure in the block unit;

recording means for recording the modulated data to the data recording medium; and control means to which the instruction information is inputted and which controls the sector segmenting means in response thereto.

2. A data recording apparatus for recording digital data to a data recording medium, comprising:

input means for receiving input data to which a first error correction code was added, and instruction information;

sector segmenting means for forming a plurality of sectors from the input data, the sectors having a plurality of structures that include a first sector structure which is formed when the instruction information indicates that the input data is a first type, and a second sector structure which is formed when the instruction information indicates that the input data is a second type, the sector segmenting means executing an error correction using the first error correction code on the input data when the input data is the first type to form first corrected data, each sector having a multi-byte header, the sector segmenting means executing the error correction code on the input data to detect errors in the input data, forming the plurality of sectors to have the first structure when no errors have been detected, and forming the plurality of sectors to have the second structure when errors have been detected;

block segmentation means for forming a plurality of block units from the sectors, the block units having a plurality of structures that include a first block structure which includes a plurality of sectors having the first sector structure, and a second block structure which includes a plurality of sectors having the second sector structure, the block segmentation means including coding means for adding a second error correction code to each block unit;

recording processing means for performing a predetermined digital modulation to the data to which the second error correction code was added, the recording processing means forming a block synch in each block unit, the block synch identifying a type of sector structure in the block unit;

recording means for recording the modulated data to the data recording medium; and control means to which the instruction information is inputted and which controls the sector segmenting means in response thereto.

3. A data recording apparatus for recording digital data to a data recording medium, comprising:

input means for receiving input data and instruction information from an outside source, the instruction information being formed from data input by a user;

sector segmenting means for forming a plurality of sectors from the input data, the sectors having a plurality of structures which include a first sector structure which is formed when the instruction information indicates that the input data is a first type, and a second sector structure which is formed when the instruction information indicates that input data is a second type, the sector segmenting means adding a first error correction code to sectors having the first sector structure, each sector having a multi-byte header;

block segmentation means for forming a plurality of block units from the sectors, the block units having a plurality of structures that include a first block structure that includes a plurality of sectors having the first sector structure, and a second block structure that includes a plurality of sectors having the second sector structure, the block segmentation means including coding means for adding a second error correction code to each block unit;

recording processing means for performing a predetermined digital modulation to the data to which the second error correction code was added, the recording processing means forming a block synch in each block unit, the block synch identifying a type of sector structure in the block unit;

recording means for recording the modulated data to the data recording medium; and control means to which the instruction information is inputted and which controls the sector segmenting means in response thereto.

4. A data recording method of recording digital data onto a data recording medium, comprising the steps of:

receiving input data and instruction information from an outside source, the instruction information being formed from data input by a user;

forming a plurality of sectors from the input data, the sectors having a plurality of structures that include a first sector structure which is formed when the instruction information indicates that the input data is a first type, and a second sector structure which is formed when the instruction information indicates that the input data is a second type, each sector having a multi-byte header;

adding a first error correction code to sectors having the first sector structure;

forming a plurality of block units from the sectors, the block units having a plurality of structures that include a first block structure that includes a plurality of sectors having the first sector structure, and a second block structure that includes a plurality of sectors having the second sector structure;

adding a second error correction code to each block unit;

performing a predetermined digital modulation to the data to which the second error correction code was added;

forming a block synch in each block unit, the block synch identifying a type of data in the block unit;

recording the modulated data onto the data recording medium; and receiving the instruction information and controlling the forming a plurality of sectors step in response thereto.

5. An apparatus for recording digital data onto a data recording medium, the apparatus comprising:

an input circuit that receives input data and instruction information, the instruction information being formed from data input by a user;

a sector segmenting circuit connected to the input circuit that forms a plurality of sectors from the input data, the sectors having a plurality of structures that include a first sector structure which is formed when the instruction information indicates that the input data is a first type, and a second sector structure which is formed when the instruction information indicates that the input data is a second type, each sector having a multi-byte header;

a block segmentation circuit connected to the sector segmenting circuit that forms a plurality of block units from the sectors, the block units having a plurality of structures that include a first block structure that includes a plurality of sectors having the first sector structure, and a second block structure that includes a plurality of sectors having the second sector structure;

a recording processing circuit connected to the block segmentation circuit that modulates the data in the block units to form modulated data, the recording processing circuit forming a first block synch in each first block unit and a second block synch different from the first block synch in each second block unit;

a recording circuit connected to the recording processing circuit that records the modulated data to the data recording medium; and a controller connected to the sector segmenting circuit that receives the instruction information, and controls the sector segmenting circuit in response thereto.

6. An apparatus for recording digital data onto a data recording medium, the apparatus comprising:

an input circuit that receives input data and instruction information, the input data including an error correcting code;

a sector segmenting circuit connected to the input circuit that forms a plurality of sectors from the input data, the sectors having a plurality of structures that include a first sector structure which is formed when the instruction information indicates that the input data is a first type, and a second sector structure which is formed when the instruction information indicates that the input data is a second type, each sector having a multi-byte header, the sector segmenting circuit executing the error correction code on the input data to detect errors in the input data, forming the plurality of sectors to have the first structure when no errors have been detected, and forming the plurality of sectors to have the second structure when errors have been detected;

a block segmentation circuit connected to the sector segmenting circuit that forms a plurality of block units from the sectors, the block units having a plurality of structures that include a first block structure that includes a plurality of sectors having the first sector structure, and a second block structure that includes a plurality of sectors having the second sector structure;

a recording processing circuit connected to the block segmentation circuit that modulates the data in the block units to form modulated data, the recording processing circuit forming a first block synch in each first block unit and a second block synch different from the first block synch in each second block unit;

a recording circuit connected to the recording processing circuit that records the modulated data to the data recording medium; and a controller connected to the sector segmenting circuit that receives the instruction information, and controls the sector segmenting circuit in response thereto.

* * * * *